US010761319B2

(12) United States Patent
Kumar (10) Patent No.: US 10,761,319 B2
(45) Date of Patent: Sep. 1, 2020

(54) VEHICLE CAMERA WITH LENS HEATER

(71) Applicant: Magna Electronics Inc., Auburn Hills, MI (US)

(72) Inventor: Pramod Kumar, Farmington Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 16/156,160

(22) Filed: Oct. 10, 2018

(65) Prior Publication Data

US 2019/0113743 A1    Apr. 18, 2019

Related U.S. Application Data

(60) Provisional application No. 62/571,949, filed on Oct. 13, 2017.

(51) Int. Cl.
*H04N 5/225* (2006.01)
*G02B 27/00* (2006.01)
*B60R 11/04* (2006.01)
*B60R 11/00* (2006.01)

(52) U.S. Cl.
CPC .......... *G02B 27/0006* (2013.01); *B60R 11/04* (2013.01); *H04N 5/2252* (2013.01); *H04N 5/2254* (2013.01); *H04N 5/22521* (2018.08); *B60R 2011/0026* (2013.01)

(58) Field of Classification Search
None
See application file for complete search history.

(56) References Cited

U.S. PATENT DOCUMENTS

| | | | |
|---|---|---|---|
| 4,157,161 A | 6/1979 | Bauer | |
| 4,168,491 A * | 9/1979 | Phillips | H02J 3/14 307/39 |
| 5,550,677 A | 8/1996 | Schofield et al. | |
| 5,670,935 A | 9/1997 | Schofield et al. | |
| 5,719,778 A † | 2/1998 | Suzumura | |
| 5,949,331 A | 9/1999 | Schofield et al. | |
| 6,554,210 B2 | 4/2003 | Holt et al. | |
| 6,719,215 B2 | 4/2004 | Drouillard | |
| 6,944,908 B2 | 9/2005 | Hoetzer et al. | |
| 7,014,131 B2 | 3/2006 | Berning et al. | |
| 7,267,290 B2 | 9/2007 | Gopalan et al. | |

(Continued)

FOREIGN PATENT DOCUMENTS

| | | | | |
|---|---|---|---|---|
| EP | 2949521 A1 | 12/2015 | | |
| GB | 2548212 A * | 9/2017 | | B60S 1/566 |

(Continued)

*Primary Examiner* — Shadan E Haghani
(74) *Attorney, Agent, or Firm* — Honigman LLP (57) ABSTRACT

A camera for a vehicular vision system includes a housing and a lens barrel including a lens. The camera is configured to be disposed at an exterior portion of a vehicle so as to have a field of view exterior of the vehicle. A heating device is disposed at an exterior of the lens barrel. The heating device includes a thin foil heating element that at least partially circumscribes the lens barrel. The heating device includes an electrical lead that is configured to electrically connect to an electrical connector of the vehicle when the camera is disposed at the exterior portion of the vehicle.

12 Claims, 8 Drawing Sheets

(56) References Cited

U.S. PATENT DOCUMENTS

| | | | |
|---|---|---|---|
| 7,480,149 B2 | 1/2009 | DeWard et al. | |
| 7,532,233 B2 | 5/2009 | Chu | |
| 7,965,336 B2 * | 6/2011 | Bingle | B60R 11/04 348/374 |
| 7,994,453 B2 * | 8/2011 | Richards | G01N 1/2214 219/201 |
| 8,542,451 B2 | 9/2013 | Lu et al. | |
| 8,567,963 B1 | 10/2013 | Criscuolo et al. | |
| 8,671,504 B2 † | 3/2014 | Ono | |
| 9,083,864 B2 * | 7/2015 | Reed | G03B 17/02 |
| 9,327,689 B2 | 5/2016 | Kikuta et al. | |
| 9,645,392 B2 | 5/2017 | Yoshimura | |
| 9,961,722 B2 † | 5/2018 | Chae | |
| 10,059,280 B2 * | 8/2018 | Cooper | B60R 11/04 |
| 2003/0090569 A1 | 5/2003 | Poechmueller | |
| 2004/0189831 A1 | 9/2004 | Shibatani et al. | |
| 2007/0132610 A1 | 6/2007 | Guemalec et al. | |
| 2007/0273971 A1 | 11/2007 | Waldmann et al. | |
| 2009/0244361 A1 | 10/2009 | Gebauer et al. | |
| 2009/0250533 A1 | 10/2009 | Akiyama et al. | |
| 2011/0073142 A1 | 3/2011 | Hattori et al. | |
| 2011/0266375 A1 | 11/2011 | Ono et al. | |
| 2011/0292212 A1 | 12/2011 | Tanabe et al. | |
| 2012/0117745 A1 | 5/2012 | Hattori et al. | |
| 2012/0017011 A1 † | 7/2012 | Chu | |
| 2012/0243093 A1 | 9/2012 | Tonar et al. | |
| 2013/0092758 A1 | 4/2013 | Tanaka et al. | |
| 2013/0146577 A1 | 6/2013 | Haig et al. | |
| 2013/0255023 A1 | 10/2013 | Kikuta et al. | |
| 2013/0300869 A1 | 11/2013 | Lu et al. | |
| 2013/0319486 A1 | 12/2013 | Kikuta et al. | |
| 2014/0060582 A1 | 3/2014 | Hartranft et al. | |
| 2014/0104426 A1 | 4/2014 | Boegel et al. | |
| 2014/0232869 A1 | 8/2014 | May et al. | |
| 2014/0037449 A1 † | 12/2014 | Nikaido | |
| 2015/0138357 A1 | 5/2015 | Romack et al. | |
| 2015/0183404 A1 | 7/2015 | Romack et al. | |
| 2015/0321621 A1 | 11/2015 | Van Dan Elzen et al. | |
| 2015/0327398 A1 | 11/2015 | Achenbach et al. | |
| 2015/0344001 A1 | 12/2015 | Lopez Galera et al. | |
| 2016/0010331 A1 † | 4/2016 | Rousseau | |
| 2016/0103316 A1 | 4/2016 | Rousseau | |
| 2016/0264064 A1 | 9/2016 | Byrne et al. | |
| 2016/0272163 A1 | 9/2016 | Dreiocker et al. | |
| 2018/0017643 A1 † | 6/2018 | Kim | |
| 2018/0207691 A1 | 7/2018 | Byrne et al. | |
| 2018/0207692 A1 | 7/2018 | Ling | |
| 2019/0004163 A1 † | 2/2019 | Park | |

FOREIGN PATENT DOCUMENTS

| | | |
|---|---|---|
| JP | 2007053448 A | 3/2007 |
| WO | 2012138455 A1 | 10/2012 |

\* cited by examiner
† cited by third party

| | | | |
|---|---|---|---|
| Max Camera Wattage (CAMw) | 6.8 | W | Power consumption of all IC's from Vout2 supply |
| Vin2 @camera (Vin) | 22 | V | Min operating voltage, impacts coax current and inductor sizes |
| HV Buck Reg2 eff (Eff) | 89% | | 24V to 12V efficiency |
| Camera input Wattage prior to buck reg (Pin) | 7.640 | W | Pin in figure below |
| Coax line current (Coaxi) | 0.347 | mA | critical parameter to minimize line drop and inductor sizes |
| Coax impedance Tol (Coaximp) | 0.26 | ohms/m | does not include gnd shield return |
| Coax impedance Tol (CoaxTol) | 30% | | |
| Coax imped temp increase (TempCoax) | 20% | | assumes 85C max |
| N meters of coax | 10 | | |
| High Freq Inductor max ESR (ESR_hi) | 0.03 | ohms | assumes same filters used at each end. |
| Low Freq Inductor max ESR (ESR_lo) | 0.73 | ohms | combined ferrite ESR for each end |
| Inductor ESR temp increase (IndTEMP) | 39% | | combined ferrite ESR for each end |
| Total max end-to-end line impedance (Rtotal) | 6.17 | ohms | from Vout1 to Vin2 |
| Total coax line drop (TotalDrop) | 2.14 | V | Vout1-Vin2, assumes Vin2 = 4V (max coax current condition) |
| Vout required at ECU power source (Vout1) | 24.14 | V | this is min Vout1 supply to ensure Vin2 min. |
| Vout at ECU coax connector (Vcoax) | 23.78 | V | minimum voltage available on coax connector |

FIG. 9

VEHICLE CAMERA WITH LENS HEATER

CROSS REFERENCE TO RELATED APPLICATION

The present application claims the filing benefits of U.S. provisional application Ser. No. 62/571,949, filed Oct. 13, 2017, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

Obscuring view by mud, salt or dust is becoming an increasing issue for vehicle cameras as their ability to determine and recognize objects can be limited or interrupted. Vehicle manufacturers have recently started to add washer nozzles mounted at the vehicle in close proximity to the camera lens. These washer nozzles spray a high pressure stream of water onto the lens when activated, thus cleaning the lens within a short amount of time. Typically, the camera washer is integrated into the existing windshield washer system and is activated through the same pump.

For some unique applications, a lens heating function may be included within some cameras to defog the elements when needed. This function is typically very expensive and it is difficult to assemble the heating element inside of the camera. Such a heating function typically requires an entirely different camera design that is larger and must have additional connection circuits. The production assembly processes would be unique, more manually intensive and costly.

SUMMARY OF THE INVENTION

The present invention provides a vision system or imaging system for a vehicle that utilizes one or more cameras (preferably one or more CMOS cameras) to capture image data representative of images exterior of the vehicle, and provides a heating element to heat the lens of the camera, and optionally a lens washer attachment that provides pressurized fluid at the camera lens. The camera may be mounted or disposed at an exterior structure of the vehicle, such as, for example, a vehicle panel, grill, bumper, fascia, light bar, center high mounted stop lamp (CHMSL) or the like, with its lens viewing exterior of the vehicle. The heating element comprises a thin resistive foil or strip that at least partially circumscribes the lens barrel.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
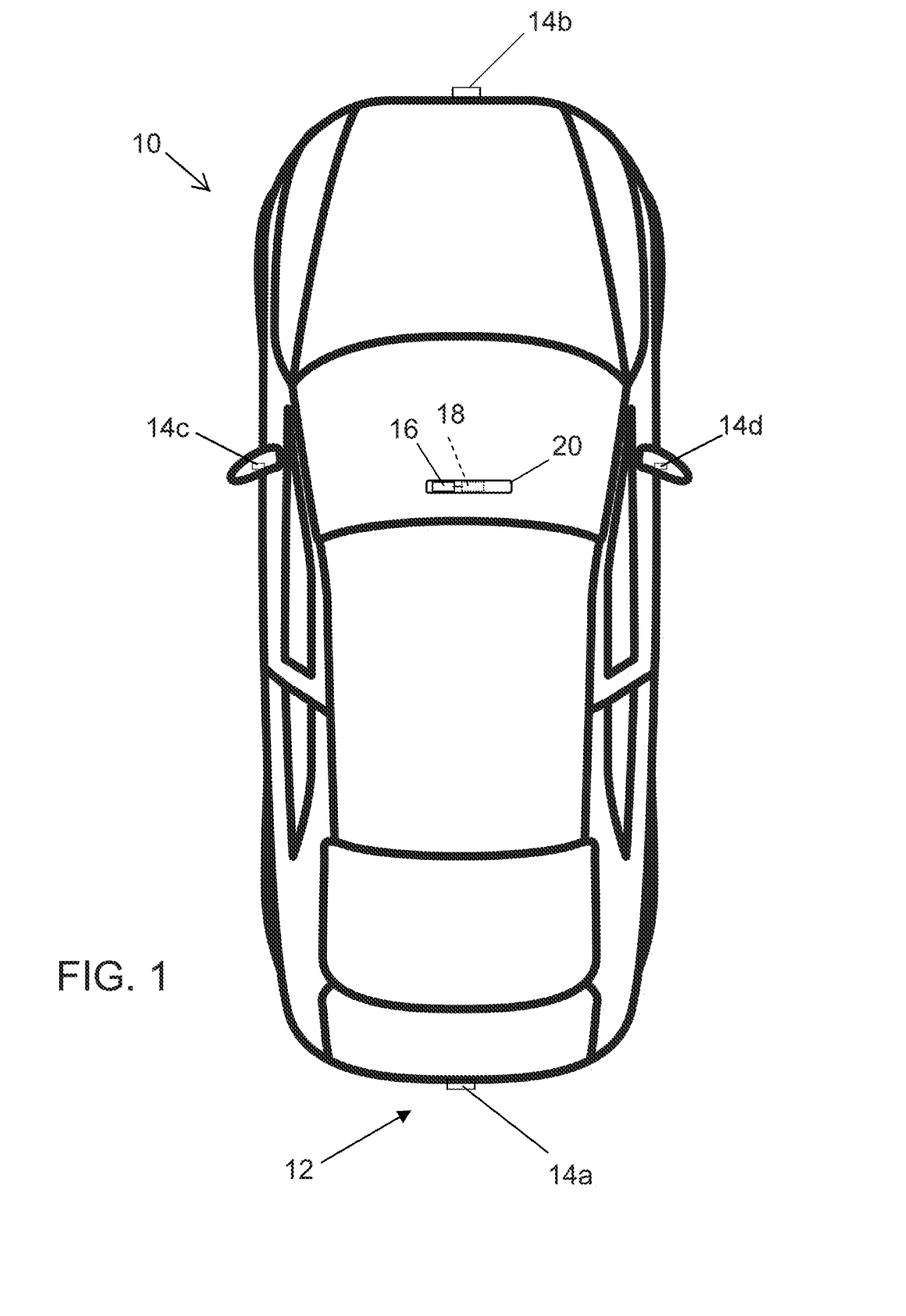
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forward facing camera 14b at the front (or at the windshield) of the vehicle, and a sideward/rearward facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The cameras each include a housing and imager and a lens that is oriented such that the camera views exterior of the vehicle. Because the camera is disposed at the vehicle exterior, such cameras are exposed to cold temperatures and temperature and humidity fluctuations, whereby moisture and/or ice or snow may form or collect at the lens. Such automotive camera lenses are also susceptible to dirt or debris collecting at the lens of the camera. This is particularly an issue for cameras mounted at the front of a vehicle, such as at a front bumper or grill or fascia of the vehicle, or at the rear of the vehicle.

Figure 2:
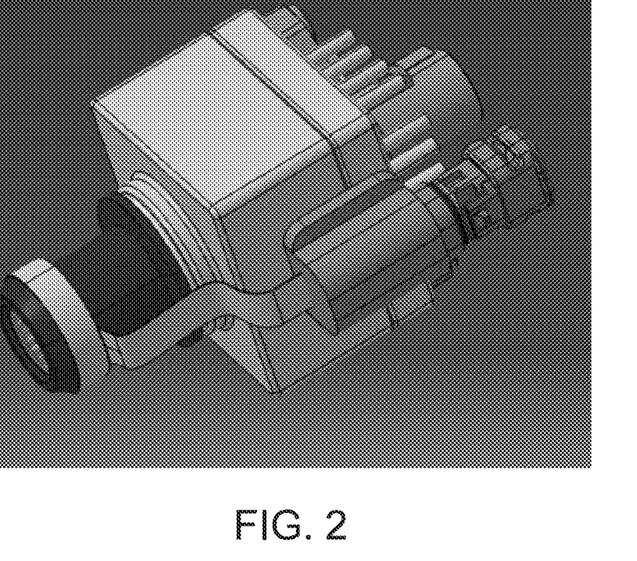
FIG. 2 is a perspective view of a camera and heater element in accordance with the present invention.
Figure 3:
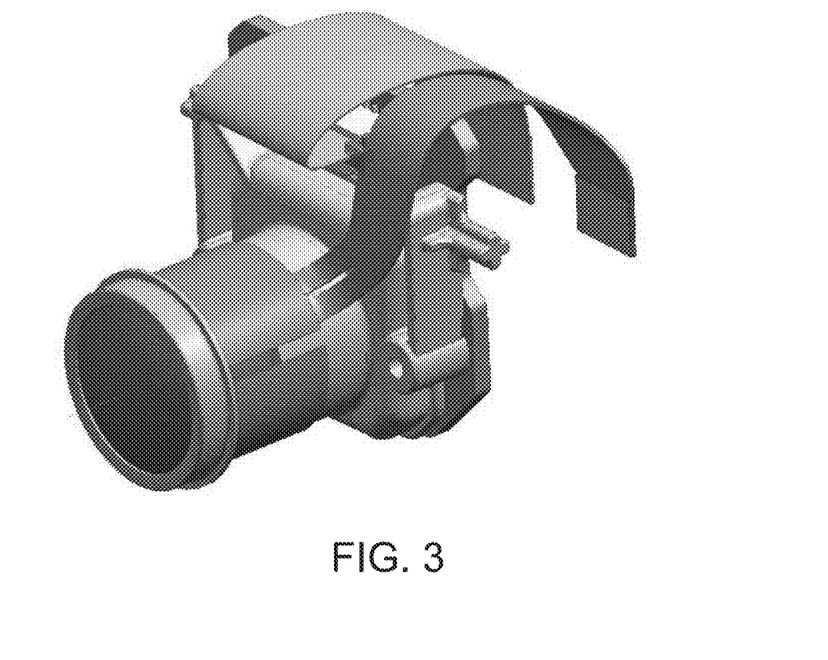
FIG. 3 is a perspective view of another camera and heater element in accordance with the present invention.

The camera includes a heater element, temperature sensor and smart heater driver. The heater can be turned on and may generate power up to about 60 W and optionally up to about 90 W. The heater can help to deice or remove condensed water deposited on lens. The heater foil is mounted on the cylindrical lens holder (see FIGS. 2 and 3). Also, a temperature sensor can be integrated with the heater foil element to sense the temperature at the lens. Optionally, in order to measure temperature in case the temperature sensor is broken (or not included), the camera and system can measure or determine the current being drawn by the heater element and can estimate the temperature at the lens based on the current level and power consumption of the heater element. Also, the heater element can help to meet power requirements for Power over Coax (POC) cameras (see FIG. 8).

This camera may optionally also include a fluid spraying device that connects to a pressurized fluid supply and has a fluid passageway and nozzle so as to spray fluid onto the lens to clean the lens of dirt or debris. The spraying or cleaning device may operate with or separate from the heating device.

Figure 4:
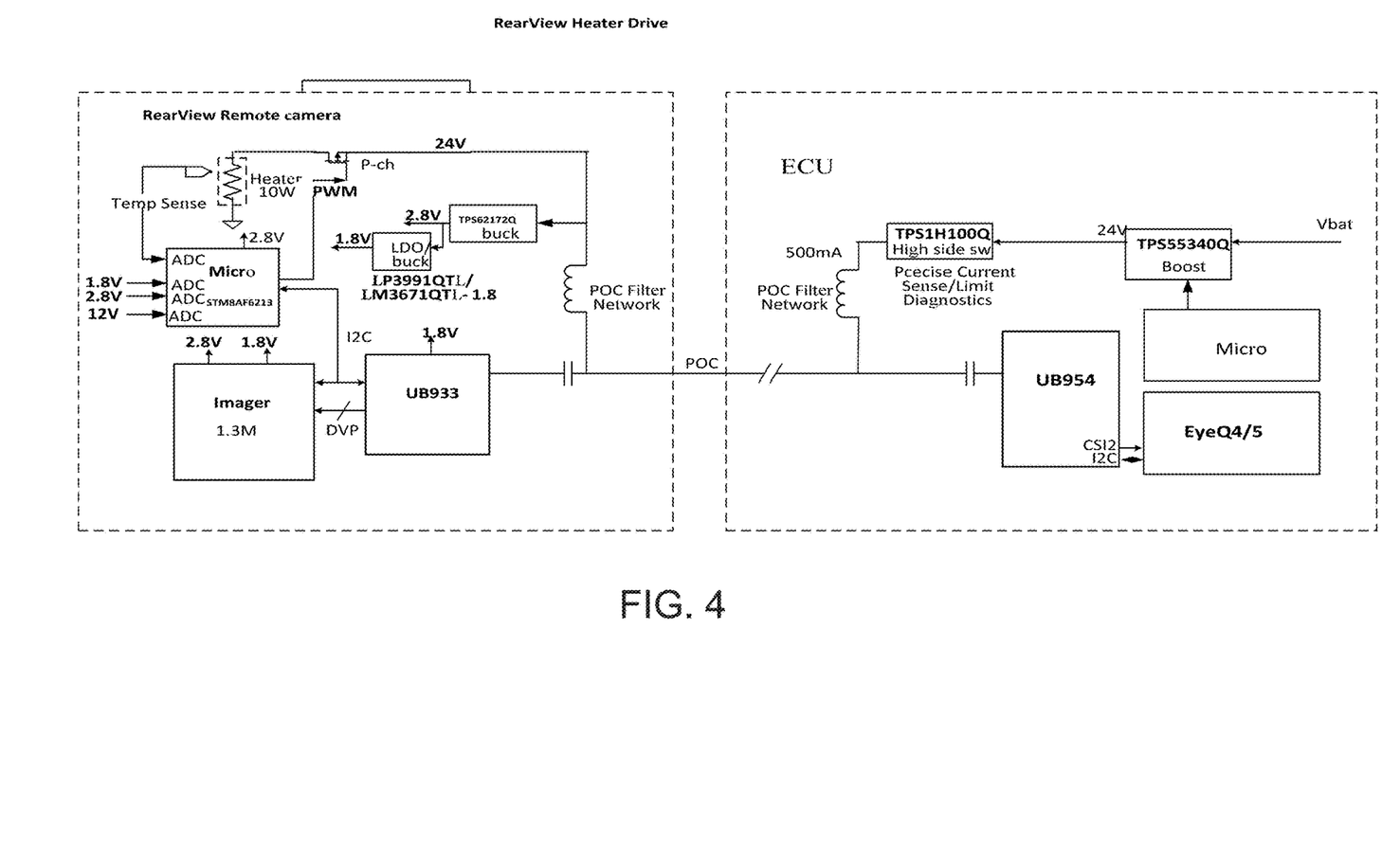
FIG. 4 is a schematic of a camera heating system of the present invention.
Figure 5:
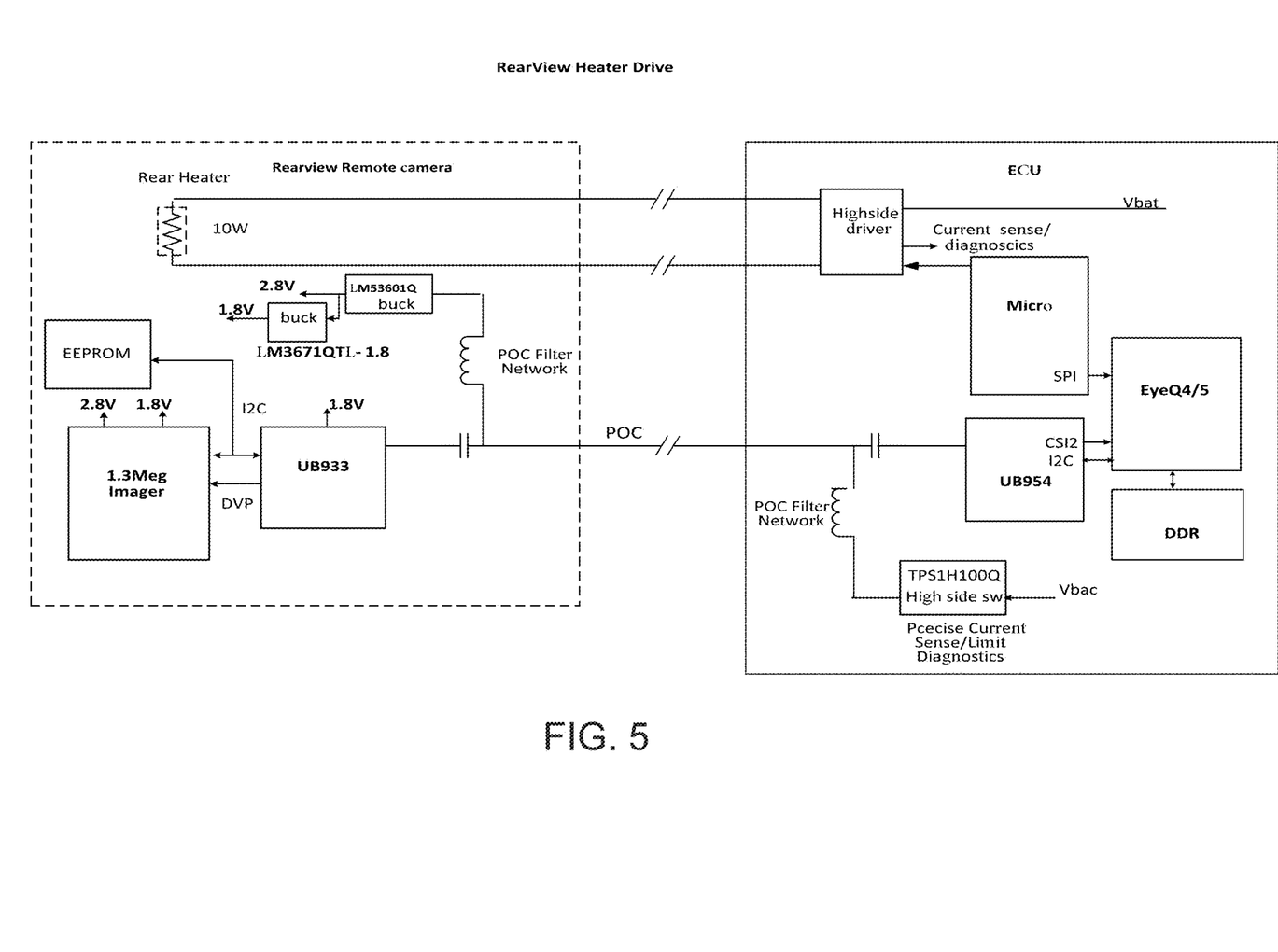
FIG. 5 is a schematic of another camera heating system of the present invention.
Figure 6:
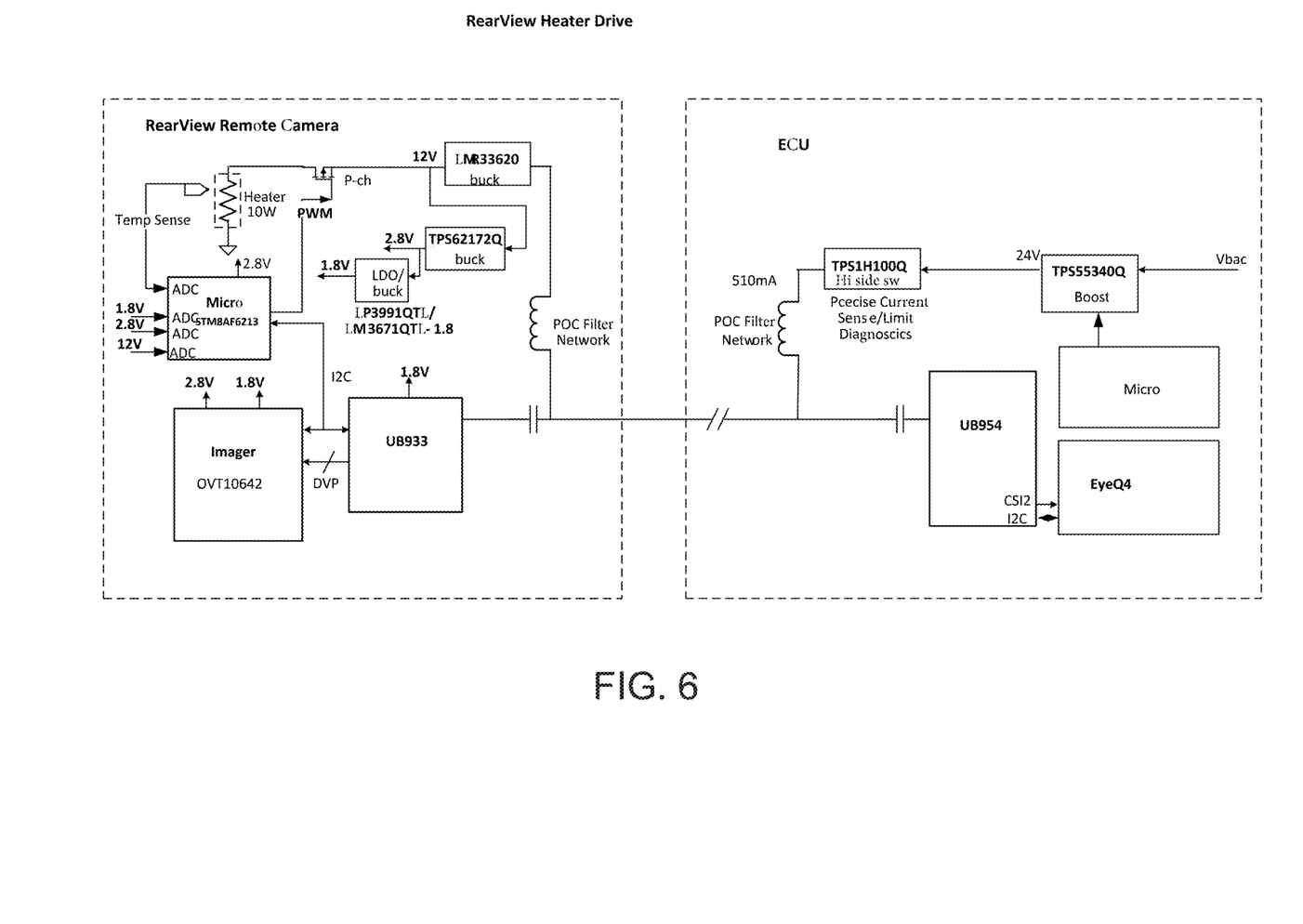
FIG. 6 is a schematic of another camera heating system of the present invention.
Figure 7:
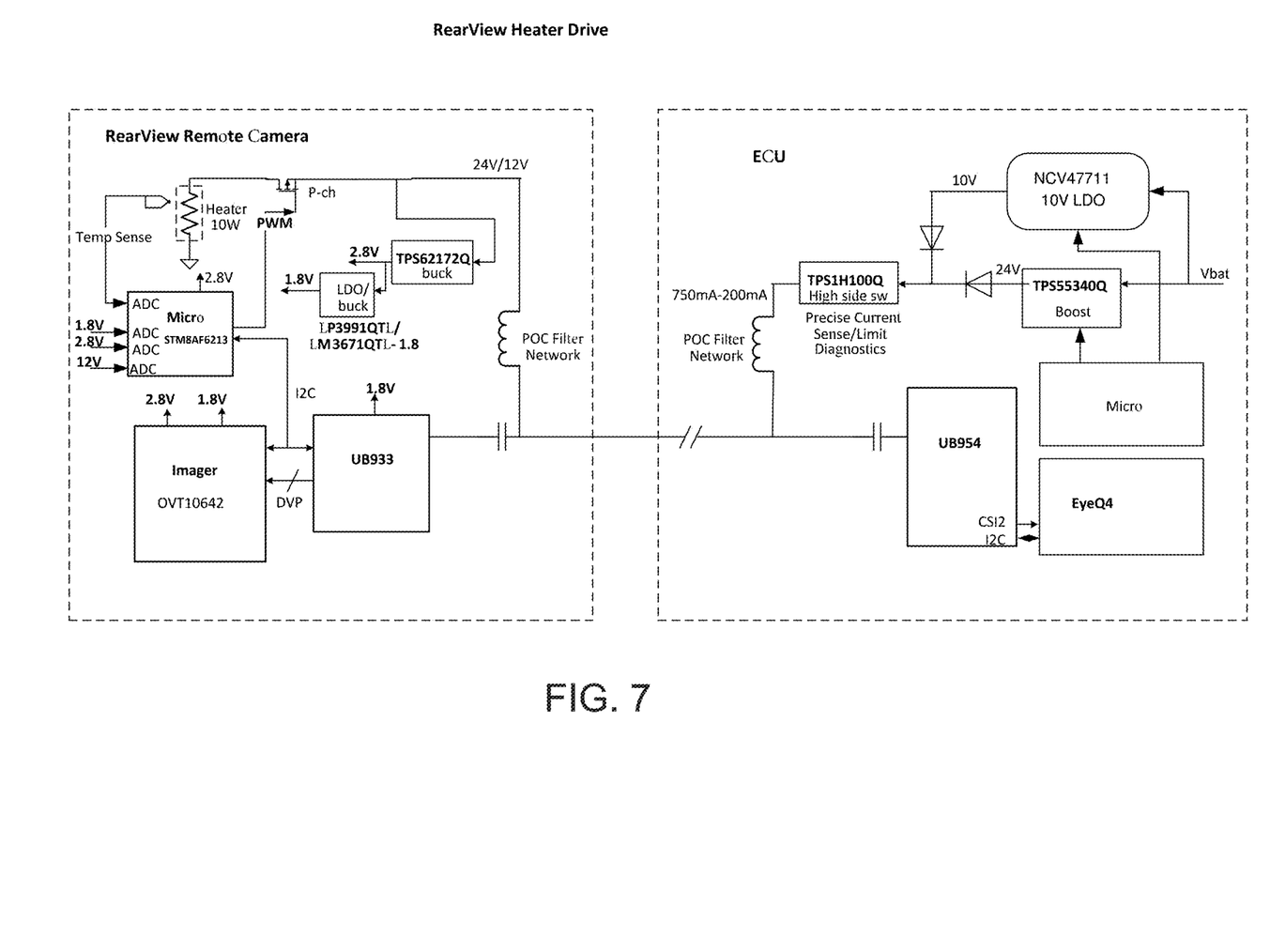
FIG. 7 is a schematic of another camera heating system of the present invention.

Thus, the heating device of the present invention comprises a foil heating element that is disposed around the lens barrel of the exterior vehicle camera, whereby the foil heating element at least partially circumscribes the lens barrel so as to heat the lens barrel (and lens optics disposed therein) when the heating device is powered. The diagrams of FIGS. 4-7 show different options to control the heating element. For example, the diagrams of FIGS. 4, 6 and 7 show use of a temperature sensor at the camera, while the diagram of FIG. 5 shows temperature determination or estimation via sensing the current flowing through the heater element.

Figure 8:
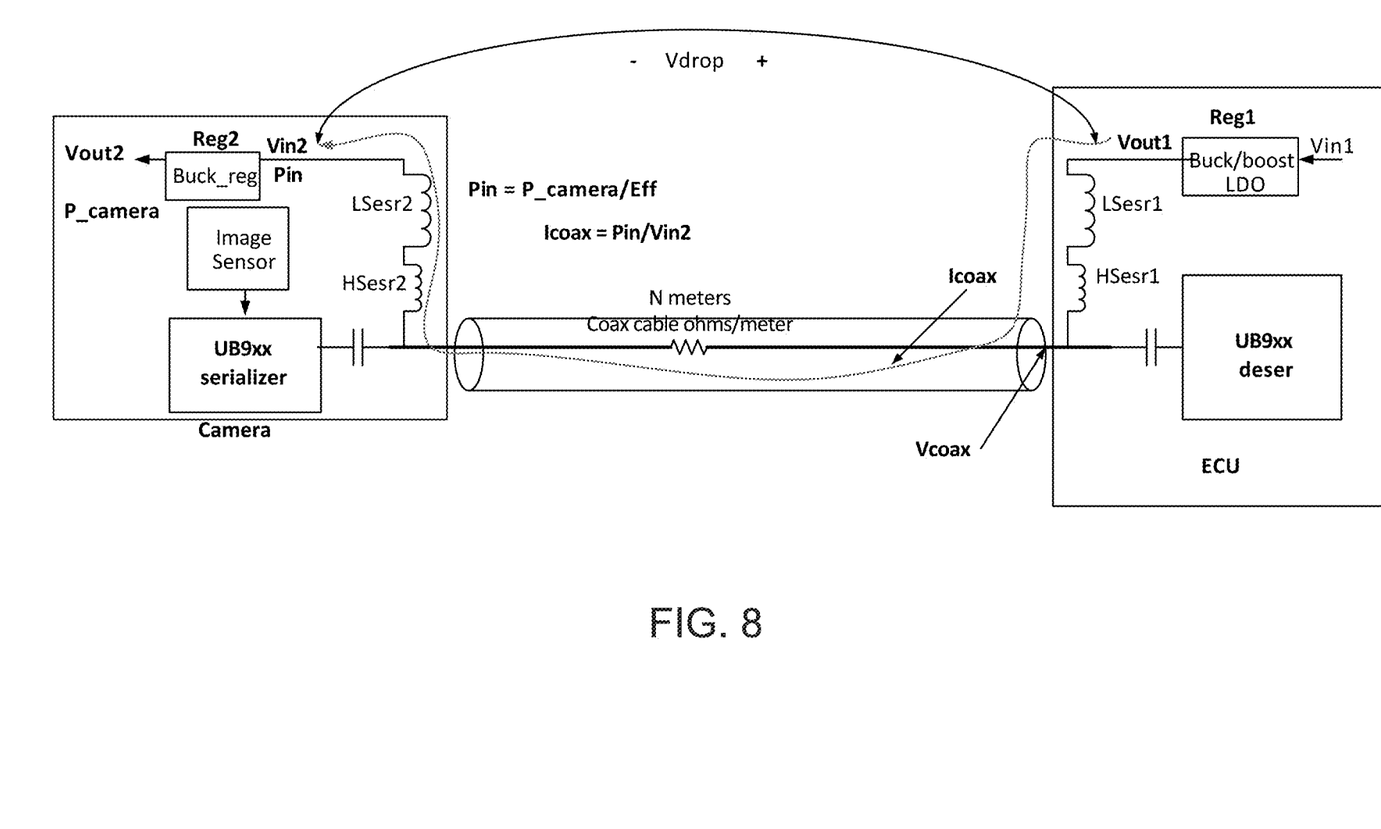
FIG. 8 is a schematic of another camera heating system of the present invention.
Figure 9:
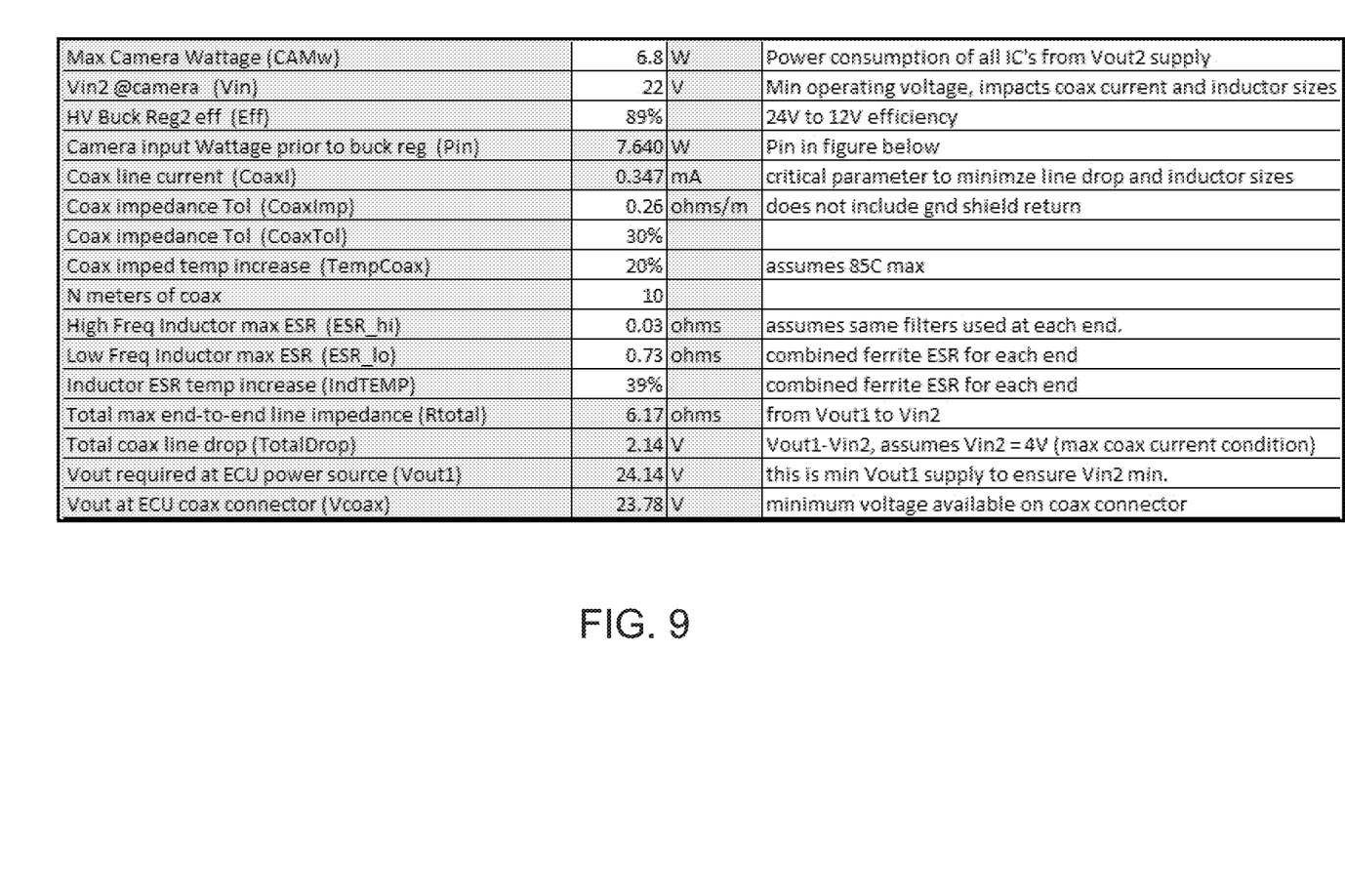
FIG. 9 is a table showing various parameters associated with the exemplary system of FIG. 8.

FIG. 8 shows the camera connected to the ECU via a coaxial cable connection. At power up and prior to the camera load being active, the current draw across the coaxial cable will be very low, resulting in minimal total line voltage drop. The max "open circuit" voltage from the ECU is selected or specified to ensure that the camera power management has sufficient voltage rating. The power over coax heater may provide a maximum camera wattage of about 6.8 Watts (power consumption of all of the integrated circuits from the Vout2 supply in FIG. 8), with the input voltage at the camera (Vin2) being about 22 volts (the minimum operating voltage, which impacts the coaxial cable current and inductor sizes). Various parameters associated with an exemplary system as shown in FIG. 8 are shown in the table of FIG. 9.

The heater is operable to deice the camera lens by heating to 70 degrees C. (or less) so that the heater can deice a 0.44 mm thick layer of ice on the lens within 30 seconds at an ambient temperature as low as −40 degrees C. The heater may achieve this with a maximum power consumption of about 10 Watts. The camera lens holder and lens retainer may comprise a plastic structure or a metallic structure (such as an aluminum or copper lens holder), depending on the particular application and desired heating (based on the thermal conductivity of the materials) of the lens via the heater foil wrapped at least partially around the lens holder.

For example, the lens may have a diameter of 12-15 mm, with an outer glass lens element or optic, and glass or polymer inner lens elements or optics, with the lens retainer comprising aluminum and the lens barrel comprising plastic.

The heater operates to melt a 0.5 mm thick ice layer within about 30 seconds, with the heater activation voltage being 10 V+/−0.25 V and deactivation being when the voltage drops below that or when the temperature at the lens reaches about 65 degrees C. Preferably, this can be achieved at ambient temperatures as low as about −40 degrees C. The parameters of the camera and heater may be selected based on what materials and dimensions achieve the desired heating results (time and temperature).

The heating element may comprise a heater foil with aluminum tape, which has a maximum power of about 4 W at about 12 V. A smart switch (to activate/deactivate the heater) may be used that provides status feedback. The heater may be operated via PWM control. Optionally, the heater may be controlled (activated, deactivated) without a temperature measurement, but using an estimation of the ambient temperature and the known power consumption, which may be calculated based on the heater resistance, battery voltage and PWM duty cycle.

The heater power consumption required to melt ice from the lens may be determined by calculating the energies it takes to change the temperature of each element (aluminum, glass, ice) from the coldest temperature of −40 degrees C. to 1 degree C. (delta of 41), and summing those energies, which are about 19 J (aluminum), 66 J (glass), 71 J (ice/water), and 280 J (melting), and total about 436 J. Thus, in order to generate 436 J in 30 seconds (the desired melting time), the heater power consumption will be about 14.5 W (436 J/30 s). In addition, there would be some heat transfer between the heater and the lens over air gaps, and heat dissipation to the remaining lens parts (barrel, other optics, spacers, etc.).

The heating elements or circuits could be directly attached to a vehicle harness or be integrated into a camera pigtail if included in the design. Activation and control of the heating element may be via messages from the camera to the vehicle's communications network. Control could also be included in this device by way of integrated temperature sensor and timer. For example, a temperature sensor may be included at the camera or heater element such that, when the sensed temperature drops below a threshold temperature, the heating device is automatically activated to heat the lens barrel to limit or preclude moisture or ice forming on the lens optics.

Thus, the present invention provides a heating system (and optionally a washer system too) that can be attached at a camera (such as at and at least partially or entirely around a lens barrel of the camera) for heating the lens. The heating system and/or washer system thus may be selected for and added to a vehicle camera, depending on the application of the camera, without any modifications to the camera itself.

The camera may utilize aspects of the cameras described in U.S. Publication Nos. US-2018-0207692; US-2016-0272163 and/or US-2016-0264064, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ™ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

For example, the vision system and/or processing and/or camera and/or circuitry may utilize aspects described in U.S. Pat. Nos. 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Publication No. US-2012-0062743, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A camera for a vehicular vision system, said camera comprising:
    a camera housing;
    a lens barrel including a lens having lens optics disposed in said lens barrel, wherein said lens barrel is attached at said housing so that said lens is optically aligned with an imager disposed in said camera housing;
    wherein said camera is configured to be disposed at an exterior portion of a vehicle so as to have a field of view exterior of the vehicle;
    a heating device disposed at an exterior of said lens barrel, said heating device comprising a thin foil heating element that at least partially circumscribes said lens barrel;
    wherein said heating device includes an electrical lead that is configured to electrically connect to an electrical connector of the vehicle when said camera is disposed at the exterior portion of the vehicle;
    a control that controls operation of said thin foil heating element responsive at least in part to temperature at said lens;
    wherein, with said electrical lead electrically connected to the electrical connector of the vehicle when said camera is disposed at the exterior portion of the vehicle, and responsive to determination that the temperature at said camera being is below a first threshold temperature, said control operates said heating device to increase the temperature of said lens barrel of said camera;
    wherein said control deenergizes said heating device responsive at least in part to determination that the temperature at said lens is at or above a second threshold temperature that is greater than the first threshold temperature; and
    a washer having a connector and fluid passageway, and wherein said connector is configured for connection to a washer system of a vehicle such that, when said camera is disposed at the exterior portion of the vehicle and when the vehicle washer system is actuated, pressurized fluid flows through said fluid passageway and onto said lens.

2. The camera of claim 1, wherein said camera is configured to be fixedly mounted at the exterior portion of the vehicle.

3. The camera of claim 2, wherein, with said camera fixedly mounted at the exterior portion of the vehicle, said lens is exposed at the exterior portion of the vehicle.

4. The camera of claim 1, wherein said heating device, when said camera is disposed at the exterior portion of the vehicle and when said heating device is electrically powered, heats said lens barrel and the lens optics disposed therein.

5. The camera of claim 1, comprising a temperature sensor for sensing the temperature at said camera, wherein, responsive to an output of said temperature sensor that is indicative of the temperature at said camera being below the first threshold temperature, said control operates said heating device to increase the temperature of said lens barrel of said camera.

6. The camera of claim 1, wherein, responsive to a determination of current drawn by said heating device, said control estimates the temperature at said camera, and wherein said control controls operation of said heating device based at least in part on the estimated temperature.

7. The camera of claim 1, wherein said control energizes said heating device responsive to determination that an ambient temperature is below a threshold temperature.

8. The camera of claim 7, wherein said control deenergizes said heating device responsive to determination that a threshold time period following energization of said heating device has elapsed.

9. The camera of claim 7, wherein said control deenergizes said heating device responsive to determination that a power consumption of said heating device reaches a threshold level.

10. A camera for a vehicular vision system, said camera comprising:
    a camera housing;
    a lens barrel including a lens having lens optics disposed in said lens barrel, wherein said lens barrel is attached at said housing so that said lens is optically aligned with an imager disposed in said camera housing;
    wherein said camera is configured to be disposed at an exterior portion of a vehicle so as to have a field of view exterior of the vehicle, and wherein, with said camera disposed at the exterior portion of the vehicle, an outer lens optic of said lens is exposed at the exterior portion of the vehicle;
    a heating device disposed at an exterior of said lens barrel, said heating device comprising a thin foil heating element that at least partially circumscribes said lens barrel;

a control that controls operation of said thin foil heating element responsive at least in part to temperature at said lens;

a temperature sensor for sensing a temperature at said camera;

wherein said heating device includes an electrical lead that is configured to electrically connect to an electrical connector of the vehicle when said camera is disposed at the exterior portion of the vehicle;

wherein, with said electrical lead electrically connected to the electrical connector of the vehicle when said camera is disposed at the exterior portion of the vehicle, and responsive to an output of said temperature sensor that is indicative of the temperature at said camera being below a first threshold temperature, said control operates said heating device to increase the temperature of said lens barrel of said camera;

wherein said control deenergizes said heating device responsive at least in part to determination that the temperature at said lens is at or above a second threshold temperature that is greater than the first threshold temperature; and a washer having a connector and fluid passageway, wherein said connector is configured for connection to a washer system of a vehicle such that, when said camera is disposed at the exterior portion of the vehicle and when the vehicle washer system is actuated, pressurized fluid flows through said fluid passageway and onto said lens.

11. The camera of claim 10, wherein said heating device, when said camera is disposed at the exterior portion of the vehicle and when said heating device is electrically powered, heats said lens barrel and the lens optics disposed therein.

12. The camera of claim 10, wherein said control deenergizes said heating device responsive at least in part to determination that a power consumption of said heating device reaches a threshold level.

\* \* \* \* \*